J. Taggart,

Stone-Channeling Machine.

No 2,278. Reissued June 5, 1866.

AM. PHOTO-LITHO. CO. N.Y. (OSBORNE'S PROCESS)

UNITED STATES PATENT OFFICE.

THOS. ROSS, OF MIDDLEBURY, AND JNO. B. REYNOLDS, R. BARRETT, AND A. T. MERRIMAN, OF RUTLAND, VERMONT, ASSIGNEES OF JNO. TAGGART BY MESNE ASSIGNMENTS.

IMPROVED MACHINE FOR CHANNELING STONE.

Specification forming part of Letters Patent No. 13,896, dated December 4, 1855; Reissue No. 2,278, dated June 5, 1866.

*To all whom it may concern:*

Whereas Letters Patent No. 13,896 were granted to JOHN TAGGART and VERNON BROWN, as assignees of the said JOHN TAGGART, on the 4th day of December, A. D. 1855, for an Improved Machine for Channeling Stone; and whereas we, the undersigned, have become, by assignment or otherwise, the sole proprietors of the said patent; now, therefore, for the purposes of a reissue of the said patent, we do hereby declare the said invention to be fully described in the following specification, and represented in the accompanying drawings, of which—

Figure 4:
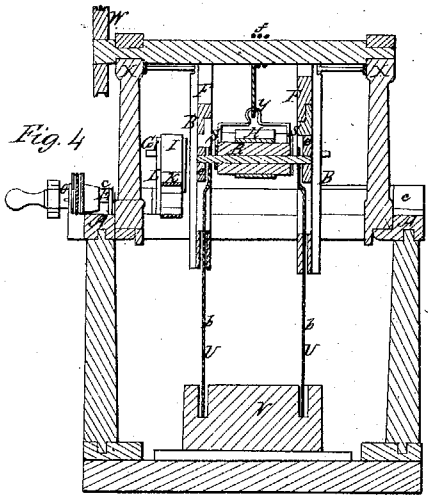
Figure 3:
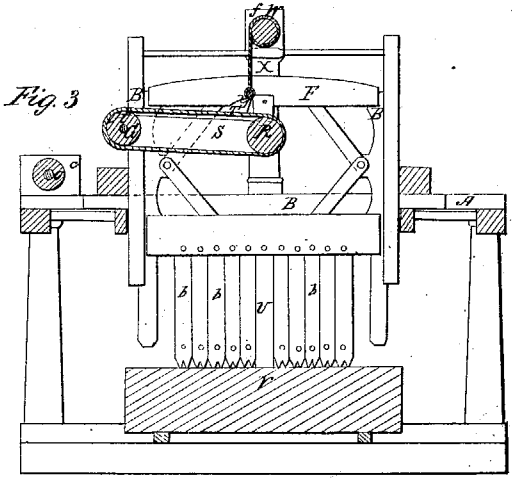
Figure 1:
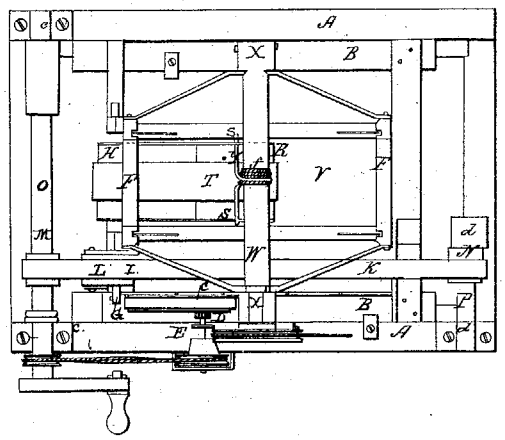
Figure 2:
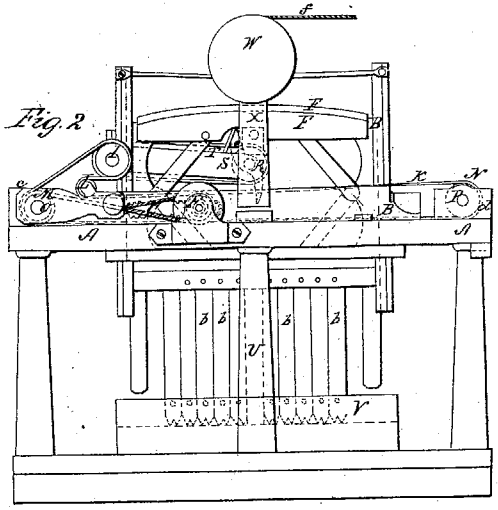

Figure 1 denotes a top view of such machine; Fig. 2, a side elevation of it; Fig. 3, a vertical central and longitudinal section of it, and Fig. 4 a transverse section of it.

In these drawings, A exhibits a frame, which supports a movable carriage, B, which is so adapted to it as to be capable of being moved rectilinearly upon it either forward or backward, it having a reciprocating motion imparted to it by means of an endless elongated internal gear, C, (applied to its side,) and a pinion, D, affixed to a vibrating shaft, E. Such mechanism being well known, for the purpose of producing reciprocating rectilinear motions, I do not confine my invention to the use of such, as any other of a suitable kind and for a similar purpose may be substituted.

The sliding carriage B sustains two or more drill-gates, F F, each of which is made to play or move vertically within guides or posts *a a*. Each of these gates or frames F F carries a series of long drills, *b b b*, arranged in one plane, as seen in the drawings. On one end of the carriage B there is a fixed or horizontal shaft, G, which supports the two pulleys or drums H I, arranged as seen in Figs. 1 and 2, an endless band, K, being made to extend around the pulley I and three pulleys, L M N, disposed as seen in said figures. The first of the last three pulleys is supported by the carriage B, while the remainder of them are respectively carried by shafts O P, that are sustained by and made to revolve in boxes *c c* and *d d*, arranged as seen in the drawings, and particularly in Figs. 1 and 2 thereof.

The shaft O is the driving-shaft of the machine, and by means of the above-described mechanism connecting it with shaft G it serves to put and maintain the latter in revolution during the rectilinear movement of the carriage B.

Around the drum H, before described, and another drum, R, supported by a frame, S, which should rock or turn freely in a vertical direction upon the shaft G, an endless band, T, is made to work, so as to transfer motion from the drum H to the drum R, upon whose shaft there is affixed directly under each drill-gate a set of lifter-cams or wipers, *e e*.

The frame S, besides being supported at one end upon the shaft G, is sustained at its other by means of standards or posts *u u*, which extend downward from the shaft of its drum R and respectively rest on the bottom of the grooves formed in the stone by the drills. Each drill-gate is elevated by the action of its wipers and allowed to fall downward toward the stone by the power of gravity.

From the above it will be seen that if the drill-gates have a quick vertical motion imparted to them while they are moved horizontally by and with their carriage B the drills of each will be made to cut the stone in a straight line, path, or groove. It will also be seen that as the mechanism for elevating the said gates is supported by standards or posts extending down therefrom and into the said grooves and resting on the bottom thereof, the said operating mechanism will be caused to descend in proportion to the descent of the drills into the stone.

In order to elevate all the drills simultaneously out of the grooves in the stone I make use of a windlass, *w*, which may be supported on posts *x x*, extended upward from the carriage B, the cord *f* of the windlass-barrel being connected to a bale, *y*, projecting upward from the frame S.

A machine constructed in manner as above described will be found very useful for the purpose for which it is intended.

From the above it will be seen that the drills of each set are arranged in a gang, they being close together and one being in advance of the other, the whole being caused while in action to cut a channel or groove in the stone.

We claim as the invention of the said TAGGART the following, viz:

1. A machine consisting of drills arranged in one or more gangs, and also of mechanism for guiding such gang or gangs of drills and imparting thereto, or causing to be imparted thereto, reciprocating movements, or the same and longitudinal movements, whereby such gang or gangs when applied to stone may be caused to cut or drill one or more grooves therein, substantially as described.

2. The combination of one or more standards U U, or the equivalent thereof, with the drills or the gang or gangs thereof and machinery for guiding and operating the same, such standard or standards being to rest in the groove or grooves in which the drills may be in action, and being for the object or purpose as hereinbefore explained.

In testimony whereof we have hereunto set our signatures this 28th day of February, A. D. 1866.

THOS. ROSS.
JOHN B. REYNOLDS.
ROCKWOOD BARRETT.
ANDREWS T. MERRIMAN.

Witnesses:
JNO. J. MYERS,
J. L. PATCH.